Jan. 4, 1955

W. L. MARTIN 2,698,883

HIGH-DUTY-CYCLE PULSE TRANSFORMER CIRCUITS

Filed April 2, 1951

INVENTOR.
William L. Martin
BY
Max L. Libman
ATTORNEY

United States Patent Office 2,698,883
Patented Jan. 4, 1955

2,698,883

HIGH-DUTY-CYCLE PULSE TRANSFORMER CIRCUITS

William L. Martin, Los Angeles, Calif., assignor to the United States of America as represented by the Secretary of Commerce Application April 2, 1951, Serial No. 218,865

7 Claims. (Cl. 179—171)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

This invention relates to a transformer-coupled amplifier or pulse-repeater stage for high-speed electronic pulses and more particularly for trains of such pulses, and has for its primary object the provision of improved circuitry for such a stage, in order to improve the operation of such stages in accurately reproducing either isolated pulses or trains of time-spaced pulses. Such pulses have many applications in high-speed electronic circuitry and are of particular interest in connection with modern high-speed electronic digital computers, where the pulse repetition rate may be in the order of one to several million pulses per second.

An example of a device using this invention is found in the electronic computer completed in March 1950 at the National Bureau of Standards and known as the SEAC (NBS Eastern Automatic Computer). A general description of SEAC will be found in the Technical News Bulletin of the National Bureau of Standards, September 1950, pp. 121–129. In this computer the problem arose of amplifying and reproducing weak input pulses having a voltage rise in the order of 7 volts, a duration in the order of 0.5 microsecond, and a repetition rate of one megacycle. These pulses are derived in SEAC by deleting various pulses from a uniform train of pulses produced by a pulse source or "clock" having a fixed repetition rate of one million pulses per second. Thus the pulses may be spaced by any integral multiple of the basic repetition period. The pulses used in SEAC have a duty cycle of the order of 50 percent; i. e., each pulse has a duration of about 0.5 microsecond and an amplitude of about 15 volts. The grouping of the pulses in a train of given length beginning with an arbitrary "first pulse" represents certain numbers or operation instructions. Such a train of pulses will be referred to as a coded pulse sequence. The presence of a pulse in any particular location in the coded pulse sequence therefore represents the binary digit "1" and the absence of a pulse in any pulse position of the coded pulse sequence represents the binary digit "0." A coded pulse sequence of 45 binary digits is known as a "word" in SEAC and is used to represent one number or one operational instruction.

In a serial computer, such as SEAC, the datum or instruction travels in serial fashion, the first pulse of a coded pulse sequence representing the first digit and the last pulse representing the final digit, all pulses travelling over the same path. Unfortunately, the pulses lose energy as they travel through the machine, and it becomes necessary to replenish this energy at intervals. Together with the pulse amplifier tube the pulse transformer has been found particularly useful in SEAC, as it enables the designer to control the polarity and impedance of his amplifier stage output so as to obtain maximum efficiency from each tube. Pulse transformers in the past have been used in circuits where they are subject to low duty cycles of 15 percent or less, whereas in SEAC the duty cycle approaches 50 percent. At such high duty-cycle operation, cumulative storage of energy takes place in pulse transformers, causing a variety of undesirable effects, since there is not time for the energy to be dissipated between pulses if conventional circuit practice is used. It is an object of my invention to eliminate or minimize these undesirable effects by providing for the dissipation of substantially all of the stored energy in the interpulse interval, as will be explained in detail below.

It is also desirable that the delay for any pulse as it passes through each stage, be uniform in order to enable the designer to predict the time-position of the pulse, before and after amplification, with respect to a time scale established by the central pulse generator or "clock." Since the machine responds satisfactorily only to a properly shaped pulse, it is important that the amplifier output be of correct form. The provision of these features constitutes other objects of my invention.

The repeater stage originally designed for SEAC consisted of a tube-amplifier, a coupled pulse transformer, and associated diode circuits arranged to establish a standard shape of input signal for each tube as well as to perform the logical functions necessary in a computer. To correct for tube variations and to obtain maximum output from below-average tubes, all tubes are operated on the steep portion of their plate characteristic curve in the region known as "bottoming," as described in the copending application of Martin, Slutz, and Senf, Serial No. 205,164, filed January 9, 1951, for Transformer-Coupled Pulse-Train Amplifiers.

As a transformer is an A.-C. coupling element and the tube output has a large D.-C. component, in the presence of continuous pulses, the transformer stores more energy by increasing its magnetizing current during each succeeding pulse, and the voltage return swing between pulses grows larger until the time integral $$\int_{t}^{t+\Delta t} E dt \text{ (where } \Delta t \text{ is the pulse period)}$$

of its output over one pulse period is equal to zero. Because energy storage causes current drawn by the tube to increase during a sequence of pulses, the tube must be bottomed further than would be otherwise necessary if one wishes to obtain uniform output above an initial voltage level, thus sacrificing some of its output capability. If the energy stored in a transformer during a pulse could be dissipated before the next pulse occurs, the full output of the tube would be available on every pulse, and each pulse would be subject to the same stage delay. Even if only a portion of this energy could be dissipated, an improvement in output would result and the variation in stage delay could be reduced. I have devised a method of, and circuitry for, producing this desirable energy dissipation in the interpulse period. To accomplish this I design the pulse transformer and load circuit so that it tends to resonate at a frequency corresponding to the pulse frequency, then by the use of a nonlinear resistance load the circuit is critically damped on the return swing (but not on the initial pulse), so that the circuit is critically damped for the stored energy, which is thus dissipated in the interpulse period. The definition of the term "critically damped" as used in the specification and claims is the same as that given in the book "Alternating-Current Circuits" by Tang (1940) at page 381. The definition as given by Tang is, "The critical resistance is merely the lowest value that will permit a single surge in an RLC circuit." The principal concept of the present invention is that the values of inductance, capacitance, and resistance during the interpulse period are such that the first oscillatory surge effectively dissipates the energy stored in the transformer windings during this period.

The specific nature of the invention, as well as other objects and advantages will clearly appear in more detail, with particular reference to the figures of the accompanying drawings in which.

Figure 1:
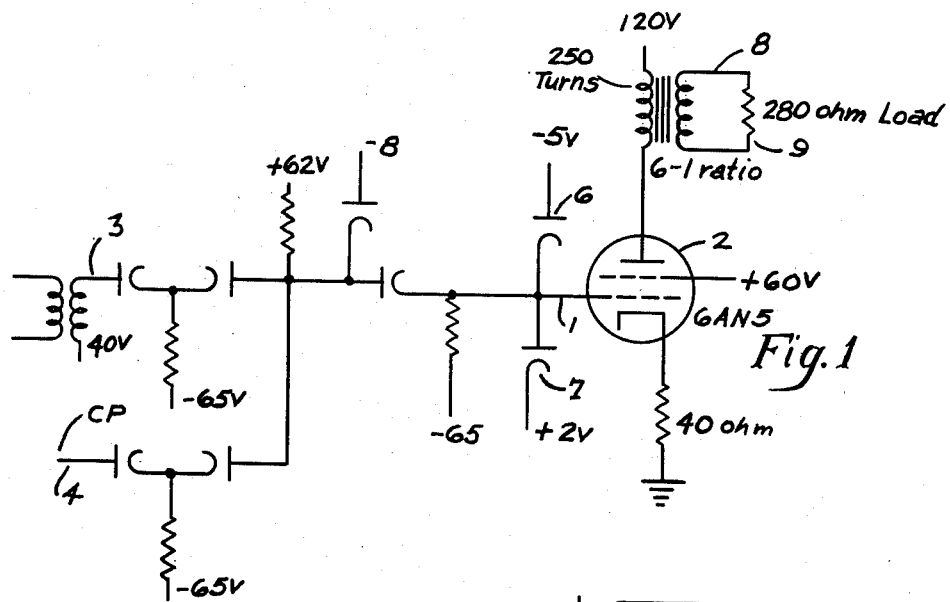
Figure 1 is a schematic diagram of a circuit initially employed prior to this invention.

The circuit first used for the pulse-repeater stage in SEAC is shown in Figure 1. The circuitry shown on the left is for the purpose of supplying a pulse to grid 1 of tube 2, when there is a coincidence of pulses on lines 3 and 4 (for example, the coincidence of a signal pulse and a clock, or timing, pulse). This pulse to the grid 1 is kept between —5 volts and +2.0 volts by the "bumper" diodes 6 and 7, which in practice are germanium diodes kept at these respective potentials as indicated. My invention is not concerned with this part of the circuit, which is shown only by way of example and because it is typical of the actual pulse circuitry used. Pulse transformer 8 is used to supply an amplified pulse to load 9 for each input pulse reaching the grid. The transformer first used in SEAC had 250 primary turns, 50 secondary turns, and a core section ⅛″ x ¼″, the core being grain-oriented silicon-iron.

Detailed analysis of the above circuit showed that the magnetizing current in the primary of transformer 8 is increased by about 6 milliamperes during each pulse during normal operation of the tube (i. e., in the "plate-bottoming" region as previously mentioned). During the interval between pulses some of this energy is dissipated. If any of it remains, this will be accumulated during successive pulses, causing the undesirable results previously discussed.

Assuming the ideal pulses shown in Figure 2a, the above energy storage occurs during the one-half microsecond duration of the pulse. It must be dissipated in the following one-half microsecond. Actually, calculations show that with the above circuit values, over 80 percent of the current initially flowing in the primary inductance of the transformer 8 is still flowing 0.5 microsecond after the pulse has ended; i. e., when the next pulse is about to begin.

The above transformer circuit is resonant because of the capacitance of the primary and secondary circuits of the transformer, which was found to be about $12 \cdot 10^{-12}$ farads. The effective primary inductance in a typical case is about $7.5 \cdot 10^{-3}$ henrys, and the effective circuit resistance about 5000 ohms. This circuit is therefore highly damped. The undamped resonant frequency is $$f = \frac{1}{2\pi\sqrt{LC}} = 0.41 \times 10^6 \text{ cycles/second}$$

for the above case.

The primary object of this invention is to provide a method of dissipating between pulses all or most of the energy stored in the transformer during a pulse so as to cause the circuit to return to its initial potential. If this latter condition could be attained without dissipating the stored energy, this would be just as satisfactory, providing the stored energy did not result in some spurious signal. In a digital pulse computer, when a train of successive pulses ends, there should be no additional pulses in the circuit; the presence of such a spurious signal would resemble an extra pulse and would entirely invalidate the entire computation or order represented by the pulse train.

If the current in the pulse train could be made to oscillate at a suitable frequency between pulses, it would pass through a potential equal to that desired after one-half period of oscillation as shown in Figure 2b. Any energy remaining in the circuit after this one-half period of oscillation would aid the tube to drive the transformer on the following pulse. However, if no following pulse occurred, this residual energy would tend to cause a spurious signal. If less than the one-half period of such oscillation (but more than one-fourth period) took place in the interval between pulses, the transformer would possibly be closer to its initial potential than it was in the case of overdamping. I provide the desired operation by use of germanium diodes (or any similar rectifier) in series with the load; these rectifiers have a low front resistance but a high back resistance, therefore no more than one-half period of oscillation can take place because during the succeeding one-half period the oscillation is heavily damped by the load which is present when the diode conducts in its backward direction. By providing proper values to make this damping critical, or in the critical region, the stored energy is reduced to nearly zero at the time of the next pulse.

In applying the above concept to SEAC it will be noted that the operating pulse repetition rate had been fixed by prior considerations at one megacycle. Using the original circuit shown in Figure 1, the resonant frequency was seen to be about one-half megacycle, so that it oscillates through less than one-fourth period before the next pulse occurs. As a result, the tube plate potential is made highly positive by the inductive backswing of the transformer at the time the next pulse may occur (the pulses are not necessarily all in adjacent succession, of course), and the current through the tube must discharge this increased potential as well as the potential normally existing across the circuit capacitance; i. e., the stage has an increased delay because of the time needed to discharge this additional potential, and pulses occurring late in a sequence are delayed to an increased degree.

Figure 2:
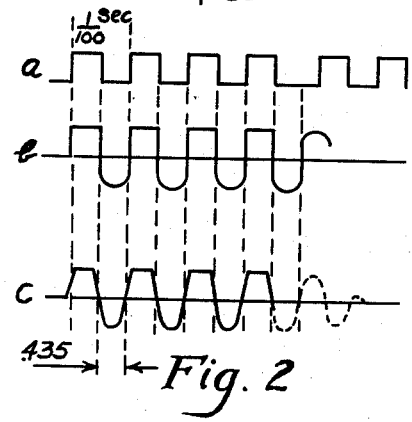
Figure 2 is a timing diagram showing the timing relationships of typical pulses involved in this invention.

In order to adapt the above circuit to my new method, the primary inductance of the transformer was decreased by using a smaller number of turns, maintaining the same turn ratio. The limit on this procedure is that current in the primary inductance (which increases the tube current) increases with decreasing inductance. The knee of the zero-bias plate characteristic curve of a below-average 6AN5 tube (and the circuit must be designed for such tubes) occurs at approximately 25 milliamperes, and the current in the transformer primary inductance added to the current in the primary load must not exceed this value if a below-average tube is to remain "bottomed" and so give uniform output to all pulses. Decreasing the primary turns by a factor of two will reduce the inductance by a factor of four and thus cause the current to oscillate at the desired frequency of one megacycle. The primary turns were therefore reduced to 120; this did not produce an appreciably decreased output, although a further reduction in the number of primary turns will unduly decrease the output. With the new values the half-period became 0.435 microsecond; that is, it takes 0.435 microsecond for the voltage across the capacitance to return to its initial value. Since in practice the pulses are not perfectly square, as shown in Figure 2, but are somewhat sloped, as shown in Figure 2c, the value of 0.435 is approximately correct for the desired period.

Figure 3:
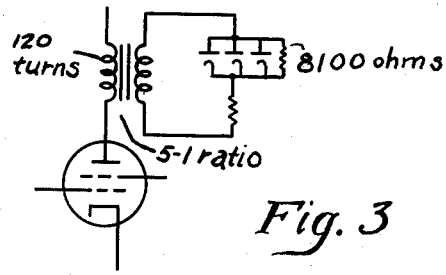
Figure 3 is a schematic diagram of a pulse repeater stage improved according to this invention.

The above change provides for the frequency, but in order to insure the desired amplitude variation, the resistance must be approximately $$\frac{1}{2}\sqrt{\frac{L}{C}}$$

so as to establish the condition for critical damping. In the above example the primary inductance, $L_p$, for the 120-turn transformer is $2.95 \times 10^{-3}$ henrys, the equivalent capacitance of primary circuit and secondary referred to the primary is taken as $12 \times 10^{-12}$ farads as before, which gives a value of 5,730 ohms necessary for the above condition. Three germanium diodes in parallel were found to have a value of 16,700 ohms, so they were shunted by 8,100 ohms of additional resistance to give the desired value for critical damping. The resultant circuit is shown in Figure 3. With these values, oscillograms were taken of the resultant pulse shape as compared with the original pulse shape after amplification.

Figure 4:
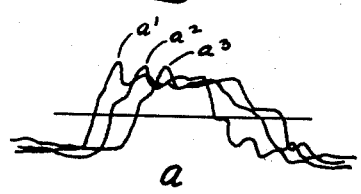
Figure 4 shows oscillograms of the results obtained (a) prior to and (b) by practicing my invention.
Figure 4:
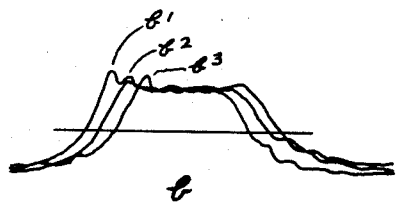

Figure 4 shows the pulse shape and delay for the pulses of three successive stages similar to the above. Figure 4a is an oscillogram of results with the 250-turn transformer using the circuit of Figure 1. Figure 4b shows the results obtained using the 120-turn transformer and near-critical damping. It will be seen that the stored energy is largely present in the first case and mostly dissipated in the second case, as represented by the value below the zero level at the beginning of each pulse. It will also be seen that the delay, as represented by the time spread between first and third stages, is smaller. In addition the decreased circuit Q caused by the smaller leakage reactance of the 120-turn transformer results in a cleaner wave form with less undesirable oscillation on the trailing edge of the pulse. It is thus proved that the practice of my invention results in the definitely improved operation which was to be expected from the theoretical considerations outlined above.

It will be apparent that the embodiments shown are only exemplary and that various modifications can be made in construction and arrangement within the scope of my invention as defined in the appended claims.

I claim:

1. The method of improving the operation of a transformer-coupled pulse amplifier stage which comprises supplying pulses to the input of the amplifier stage which have a fixed high basic repetition rate and which are transmitted in discrete groups or trains separated by discrete integral units of the basic pulse repetition frequency, resonating the transformer circuit at the basic pulse repetition frequency and critically damping the load circuit unsymmetrically during the interpulse period following each pulse, thereby effectively dissipating the energy stored in the transformer windings, during each pulse, before the following pulse begins.

2. The method of improving the operation of a transformer-coupled pulse amplifier stage, which comprises supplying flat-topped pulses which have a fixed high basic repetition rate and which are transmitted in discrete groups separated by discrete integral units of the basic pulse repetition frequency, resonating the transformer circuit at the basic pulse repetition frequency and critically damping the load circuit during the interpulse period following each pulse, thereby effectively dissipating the energy stored in the transformer windings, during each pulse, before the following pulse begins.

3. A transformer-coupled pulse train amplifier stage for accurately reproducing voltage pulses having a predetermined maximum pulse repetition rate and a high maximum duty factor, comprising an amplifier tube having a control electrode and a plate, a pulse transformer having a primary winding connected in series with said plate and a secondary winding, a load circuit connected across said secondary winding of said transformer, said transformer having such inductance and capacitance as to constitute a circuit resonant at the frequency of said voltage pulses applied to said control electrode, and a nonlinear load in said load circuit of such a low value of resistance during the pulse period as to offer little resistance to the passage of current therethrough and of such a high value of resistance during the interpulse period as to critically damp the resonant circuit, thereby effectively dissipating the energy stored in the transformer windings during each pulse period, before the following pulse begins.

4. A transformer-coupled pulse-train amplifier stage for accurately reproducing voltage pulses having a predetermined maximum pulse repetition rate and a high duty factor, comprising an amplifier tube having a control electrode and a plate, a pulse transformer having a primary winding connected in series with said plate and a secondary winding, a nonlinear load circuit connected across said secondary winding, said transformer having such inductance and capacitance that said transformer constitutes a circuit resonant at the frequency of said voltage pulses applied to said control electrode, said nonlinear load circuit including means for establishing such a low value of resistance in said load circuit during the pulse period as to offer a low resistance to the passage of current therethrough and for establishing such a high value of resistance during the interpulse period as to critically damp the resonant circuit, thereby effectively dissipating the energy stored in the transformer windings during each pulse period before the following pulse begins.

5. A transformer-coupled pulse-train amplifier stage for accurately reproducing voltage pulses having a predetermined maximum pulse repetition rate and a high duty factor, comprising an amplifier tube having a control electrode and a plate, a pulse transformer having a primary winding connected in series with said plate and a secondary winding, a nonlinear load circuit connected across said secondary winding, said transformer having such inductance and capacitance that said transformer constitutes a circuit resonant at the frequency of said voltage pulses applied to said control electrode, a first resistor, a second resistor, and at least one diode connected in said load circuit, the combined value of said resistors being equal to the critical damping resistance of the resonant circuit, and means connecting said diode to render one of said resistors ineffective during each pulse period, thereby effectively dissipating the energy stored in said transformer windings during each pulse period, before the following pulse begins.

6. The invention according to claim 5 in which said diode is connected to be nonconducting during the pulse period and conducting during the interpulse period.

7. The invention according to claim 5 in which said first resistor and said diode are connected in parallel and said second resistor is connected in series with the parallel circuit.

References Cited in the file of this patent

UNITED STATES PATENTS

| | | |
|---|---|---|
| 2,267,260 | Alexander | Dec. 23, 1941 |
| 2,352,299 | Walker | June 27, 1944 |
| 2,452,563 | Glover | Nov. 2, 1948 |
| 2,468,058 | Grieg | Apr. 26, 1949 |
| 2,488,417 | Lee | Nov. 15, 1949 |
| 2,548,579 | Bedford | Apr. 10, 1951 |
| 2,571,131 | Harris | Oct. 16, 1951 |

OTHER REFERENCES

"Television Servicing," text by Manly, pages 360, 361 published 1949 by Drake & Co., Wilmette, Illinois. (Copy in Div. 69.)